United States Patent Office

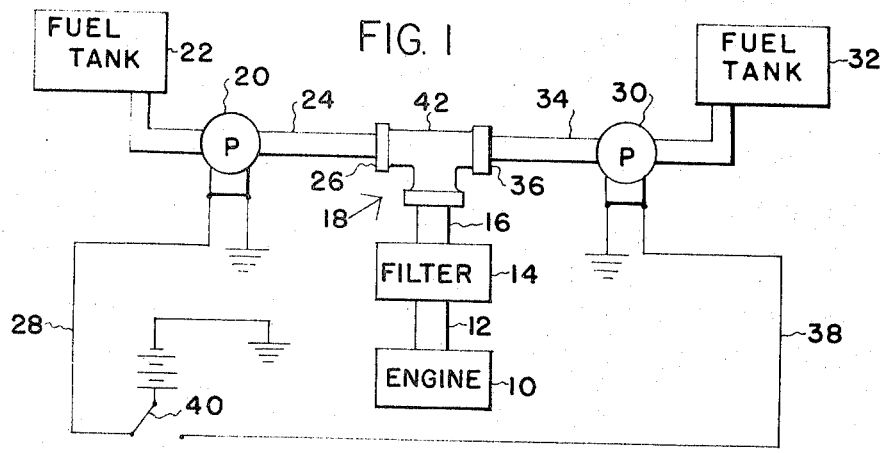
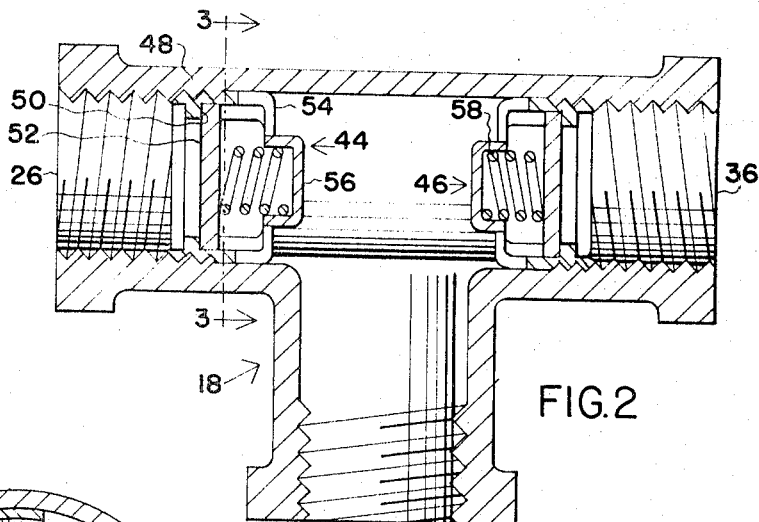
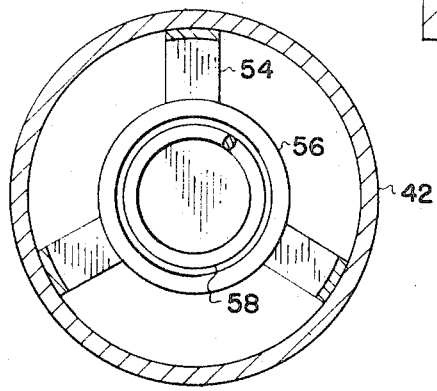

3,451,424
Patented June 24, 1969

3,451,424
FUEL CONTROL VALVE
William E. Gardner, Del Rio, Tex. (P.O. Box 1454, Uvalde, Tex. 78801), and Aubra D. Thomas, P.O. Box 828, Del Rio, Tex. 78840
Filed Feb. 14, 1967, Ser. No. 616,059
Int. Cl. F16k 15/02, 17/14, 21/04
U.S. Cl. 137—566        1 Claim

ABSTRACT OF THE DISCLOSURE

In a truck with dual fuel tanks and a pump in each tank to deliver pressurized fuel to the engine, two check valves are provided in the junction of the tank lines so that fuel is directed to the engine and not pumped from one tank to other other.

BACKGROUND OF THE INVENTION

*Field of the invention.*—This invention relates to trucks and, more particularly, to the fuel delivery system from the tanks to the engine.

*Description of the prior art.*—Presently, most commercial trucks with dual fuel tanks are equipped with an electric pump in each tank to deliver fuel under pressure through a fuel filter and to the engine. In normal operation, fuel is pumped first from one tank until it is empty and then pumped from the other tank. Under present practice, an electric solenoid valve is mounted at the juncture of the two tank lines. When the truck driver switches from one tank to another, using an electrical switch in the cab of the truck, he also uses separate electrical switch in the cab of the truck to switch the solenoid valve to a different position.

Ball check valves in the juncture of fuel lines from two tanks has been suggested by U.S. Patent No. 2,627,388 to Johnson, et al., issued Feb. 3, 1953. This system is designed for a stationary application where the valve is mounted level, remains level, and is not subject to centrifugal forces.

SUMMARY

This invention provides a simple structure having two light discs spring-loaded against valve seats. The valve discs, being very light, are fully operable in any position, giving versatility in the mounting of them. Also, they are trouble-free and not easily incapacitated by dust, dirt, water, etc.

An object of this invention is to automatically direct fuel under pressure from one of two sources to an engine.

Further objects are to achieve the above with a device that is sturdy, compact, durable, simple, safe, versatile, and reliable, yet inexpensive and easy to manufacture, install, operate, and maintain.

The specific nature of the invention, as well as other objects, uses, and advantages thereof, will clearly appear from the following description and from the accompanying drawing, the different views of which are not necessarily to the same scale.

DESCRIPTION OF THE DRAWING

FIG. 1 is a schematic representation of the engine, fuel tanks with pumps, and the control valve according to this invention.

FIG. 2 is a sectional view of the valve.

FIG. 3 is a sectional detailed view of the valve taken substantially on line 3—3 of FIG. 2.

DESCRIPTION OF THE PREFERRED EMBODIMENT

Fuel is delivered to engine 10 through engine line 12 which comes from fuel filter 14. The fuel is delivered to the fuel filter through filter line 16 from control valve 18.

Electric fuel pump 20 in the bottom of fuel tank 22 delivers fuel through intake line 24 to intake port 26 of the control valve 18. Likewise, electric fuel pump 30 in the bottom of fuel tank 32 delivers fuel through intake line 34 to intake port 36. Whether fuel is being delivered from tank 22 or tank 32 depends upon the position of electric switch 40 and whether it energizes pump 20 through electric wire 28 or pump 30 through electric wire 38.

The fuel control valve 18 has an ordinary pipe T 42 for its housing. Valve insert 44 is threaded into the intake port 26 and an identical valve insert 46 is threaded into intake port 36. Inasmuch as these inserts are identical, only insert 44 will be described in detail.

Ring 48 is threaded about its circumference so that it is adaptable to be threaded into the T 42. Inside face 50 of the ring forms a seat for valve 52. The valve 52 is a thin, circular disc. Spider 54 is attached to the ring 48 around the face 50 and has a cup 56 concentric with the valve 52 and ring 48. Light, helical spring 58 has one end fitted within the cup 56 and the other end engages valve 52.

Therefore, it may be seen that, if switch 40 is in a position to energize pump 20, fuel will flow from tank 22 through intake port 26 and valve insert 44, through filter line 16, filter 14, and engine line 12 to the engine 10. When the tank 22 becomes empty and the driver reverses switch 40, the fuel pump 30 will be energized through wire 38 and fuel will be pumped from tank 32 through intake line 34 to the intake port 36 of the control valve 18. The fuel pressure at intake port 36 will open the valve of valve insert 46 and also the pressure of the fuel will close the valve of valve insert 44, causing the fuel to be directed to filter line 16 and not into the other fuel tank 22.

It will be apparent that the embodiment shown is only exemplary and that various modifications can be made in operation, construction, materials, and arrangement within the scope of the invention as defined in the appended claim.

I claim as my invention:
1. In a truck having
  (a) an engine,
  (b) at least two fuel tanks,
  (c) a fuel pump in each fuel tank, and
  (d) lines connecting each fuel tank to the engine;
  (e) the improved control valve in combination with the above comprising:
  (f) a housing in
  (g) the form of a common pipe T with three ports,
  (h) one of the ports being connected to the engine;
  (j) each of the other ports being an inlet port and connected to one of the pumps,
  (k) two valve inserts,
  (m) one valve insert in each inlet port of the T,
  (n) each insert including
     (i) a ring,
     (ii) threads on the circumference of the ring mated with threads on the port of the T,
     (iii) a spider attached to one face of the ring,
     (iv) a cup on the spider concentric with the ring,
     (v) a circular valve disc in the spider,
     (vi) said circular valve disc flat against the face of the ring, and
     (vii) a helical spring from the cup in the spider to the valve disc.

References Cited

UNITED STATES PATENTS

| | | | |
|---|---|---|---|
| 1,902,577 | 3/1933 | Oakley | 137—512 XR |
| 2,519,968 | 8/1950 | Jordan. | |
| 2,754,659 | 7/1956 | Dick | 137—113 |
| 2,821,972 | 2/1958 | Banker | 123—127 |
| 3,254,697 | 6/1966 | Parks | 137—566 XR |

FOREIGN PATENTS

| | | |
|---|---|---|
| 488,924 | 7/1938 | Great Britain. |
| 566,463 | 9/1957 | Italy. |

DANIEL BLUM, *Primary Examiner.*

U.S. Cl. X.R.

137—512, 543.19